US012675088B2

(12) United States Patent
Amell et al.

(10) Patent No.: US 12,675,088 B2
(45) Date of Patent: Jul. 7, 2026

(54) AUTOMATED COATING SYSTEM HAVING SMART END-EFFECTOR TOOL

(71) Applicant: 3M INNOVATIVE PROPERTIES COMPANY, St. Paul, MN (US)

(72) Inventors: Nicholas G. Amell, Minneapolis, MN (US); Jonathan B. Arthur, Hudson, WI (US); Thaine W. Fuller, Lakeland, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 579 days.

(21) Appl. No.: 17/309,635

(22) PCT Filed: Dec. 17, 2019

(86) PCT No.: PCT/IB2019/060909
§ 371 (c)(1),
(2) Date: Jun. 11, 2021

(87) PCT Pub. No.: WO2020/128823
PCT Pub. Date: Jun. 25, 2020

(65) Prior Publication Data
US 2022/0050435 A1    Feb. 17, 2022

Related U.S. Application Data

(60) Provisional application No. 62/781,905, filed on Dec. 19, 2018.

(51) Int. Cl.
*G05B 19/18* (2006.01)
*B05B 12/12* (2006.01)
(Continued)

(52) U.S. Cl.
CPC ............ *G05B 19/182* (2013.01); *B05B 12/12* (2013.01); *B05B 13/0278* (2013.01);
(Continued)

(58) Field of Classification Search
None
See application file for complete search history.

(56) References Cited

U.S. PATENT DOCUMENTS 8,051,796 B2 * 11/2011 Clifford .............. B05B 13/0431
901/29
8,738,180 B2 * 5/2014 Shi ......................... B25J 9/0084
700/258
(Continued)

FOREIGN PATENT DOCUMENTS

JP       2017-154135 A     9/2017
KR         100835367      6/2008
WO   WO 2018-136499      7/2018

OTHER PUBLICATIONS

International Search Report for PCT International Application No. PCT/IB2019/060909, mailed on Apr. 17, 2020, 6 pages.

*Primary Examiner* — Jethro M. Pence
(74) *Attorney, Agent, or Firm* — Bryan L. Walker

(57) ABSTRACT

Automated systems and methods of using a smart end-effector tool (20) including an applicator (30) to apply a coating onto an object surface (2) (e.g., a wind blade) are provided. The smart tool (20) can process on-board sensor signals and update its working state with a remote robot controller (28) in real time and send instructions to the robot controller (28) to adjust the tool's travelling around the object surface (2) and optimize the applicator's (30) operation.

15 Claims, 4 Drawing Sheets

(51) Int. Cl.
    *B05B 13/02*       (2006.01)
    *B05B 13/04*       (2006.01)
    *B05C 11/06*       (2006.01)
    *B25J 11/00*       (2006.01)
    *B25J 15/00*       (2006.01)

(52) U.S. Cl.
    CPC .......... *B05B 13/0431* (2013.01); *B05C 11/06*
    (2013.01); *B25J 11/0075* (2013.01); *B25J*
    *15/0019* (2013.01); *G05B 2219/34215*
    (2013.01); *G05B 2219/39001* (2013.01)

(56) References Cited

U.S. PATENT DOCUMENTS

| | | | | |
|---|---|---|---|---|
| 9,250,624 B2 | | 2/2016 | Zimmermann | |
| 9,272,382 B2 | | 3/2016 | Trnka | |
| 9,597,797 B2 | | 3/2017 | Ponulak | |
| 10,035,237 B2 | * | 7/2018 | Panergo | B24B 41/04 |
| 10,603,752 B2 | * | 3/2020 | Morimura | B23Q 17/2409 |
| 11,254,013 B2 | * | 2/2022 | Safeldt | B25J 15/0625 |
| 11,642,686 B2 | * | 5/2023 | Camilleri | B05B 12/122 |
| 11,772,216 B2 | * | 10/2023 | Iguchi | B25J 15/0491 |
| | | | | 414/751.1 |
| 12,286,308 B2 | * | 4/2025 | Meier | B25J 15/0019 |
| 12,358,148 B2 | * | 7/2025 | Oba | B25J 11/005 |
| 2003/0130760 A1 | * | 7/2003 | Abraham | H01L 21/6715 |
| | | | | 700/213 |
| 2009/0259412 A1 | | 10/2009 | Brogardh | |
| 2012/0321800 A1 | * | 12/2012 | Scott | B05B 13/02 |
| | | | | 427/286 |
| 2015/0042716 A1 | | 2/2015 | Beier | |
| 2017/0326700 A1 | * | 11/2017 | Morimura | B23Q 11/0075 |
| 2018/0111148 A1 | * | 4/2018 | Batcheller | B05B 15/65 |
| 2018/0178239 A1 | * | 6/2018 | Morton | B63B 59/06 |
| 2019/0061079 A1 | * | 2/2019 | Morimura | B23P 23/02 |
| 2019/0176325 A1 | * | 6/2019 | Liu | B25J 9/1653 |
| 2019/0255551 A1 | * | 8/2019 | Hargadon | B25J 9/1664 |
| 2019/0283256 A1 | * | 9/2019 | Takizawa | B25J 9/1697 |
| 2020/0030983 A1 | * | 1/2020 | Fantuzzi | B28B 17/0081 |
| 2020/0078954 A1 | * | 3/2020 | Penning | B25J 9/0081 |
| 2021/0046599 A1 | * | 2/2021 | Morimura | B23Q 17/2442 |
| 2021/0278817 A1 | * | 9/2021 | Xie | B24B 53/001 |
| 2025/0121401 A1 | * | 4/2025 | Lazar | B25J 9/1697 |

* cited by examiner

AUTOMATED COATING SYSTEM HAVING SMART END-EFFECTOR TOOL

CROSS REFERENCE TO RELATED APPLICATIONS

This application is a national stage filing under 35 U.S.C. 371 of PCT/IB2019/060909 filed Dec. 17, 2019, which claims the benefit of U.S. Application No. 62/781,905, filed Dec. 19, 2018, the disclosure of which is incorporated by reference in its/their entirety herein.

TECHNICAL FIELD

The present disclosure relates to an automated coating system, and methods of making and using the same.

BACKGROUND

Typical modern wind turbines require durable protective coatings to its blade from erosion at leading edges. In many current processes, protective adhesive coatings applied to the leading edge of wind blades include polyurethane which is applied as an adhesive-backed film tape or as an epoxy. The current processes are time-consuming and manual labor-intensive.

SUMMARY

There is a desire to automate time-consuming and manual-labor-intensive coating processes, for example, to apply durable protective coatings on wind blades. In one aspect, the present disclosure describes an end-effector tool mounted on a motive robot arm to apply a coating onto an object surface. The tool includes an applicator configured to apply a coating onto an object surface; one or more first sensors configured to detect a working state of the applicator, while the applicator applies the coating onto the object surface; one or more second sensors configured to detect a travelling state of the tool, while the tool travelling under the locomotion of the motive robot arm along the object surface; and a tool control circuit to receive signals from the first and second sensors and process the signals to generate state information of the end-effector tool.

In another aspect, the present disclosure describes an automated coating system including an end-effector tool, and a motive robot arm mounted on a moving base. The tool is mounted on the motive robot arm. The tool includes an applicator configured to apply a coating onto an object surface; one or more first sensors configured to the applicator to detect a working state of the applicator, while the applicator applies the coating onto the object surface; one or more second sensors configured to detect a travelling state of the tool, while the tool travelling under the locomotion of the motive robot arm along the object surface; and a tool control circuit to receive signals from the first and second sensors and process the signals to generate state information of the end-effector tool.

In another aspect, the present disclosure describes a method of coating an object surface. The method includes providing an end-effector tool to a motive robot arm, the tool including an applicator configured to apply a coating onto the object surface; communicating the tool with the robot arm to update the respective state information; while the applicator applies the coating onto the object surface, detecting, via one or more first sensors of the tool, a working state of the applicator to generate applicator state signals, and detecting, via one or more second sensors of the tool, a travelling state of the tool to generate tool travelling state signals; processing, via a control circuit of the tool, the applicator state signals and the tool travelling state signals from the respective first and second sensors to generate real-time tool state information, notifications or instructions; transmitting the real-time tool state information, the notifications, or the instructions from the control circuit to a robot controller of the robot arm; and adjusting the tool's movement with respect to the object surface and the applicator's operation based on the real-time tool state information, the notifications, and the instructions from the end-effector tool.

Various unexpected results and advantages are obtained in exemplary embodiments of the disclosure. One such advantage of exemplary embodiments of the present disclosure is that the autonomy and precision control of coating systems and methods that use a smart end-effector tool including an applicator to apply a coating onto an object surface. The smart tool can update its working state with a robot arm in real time, which in turn can dynamically and automatically adjust the tool's movement along the object surface and the applicator's operation during the movement.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
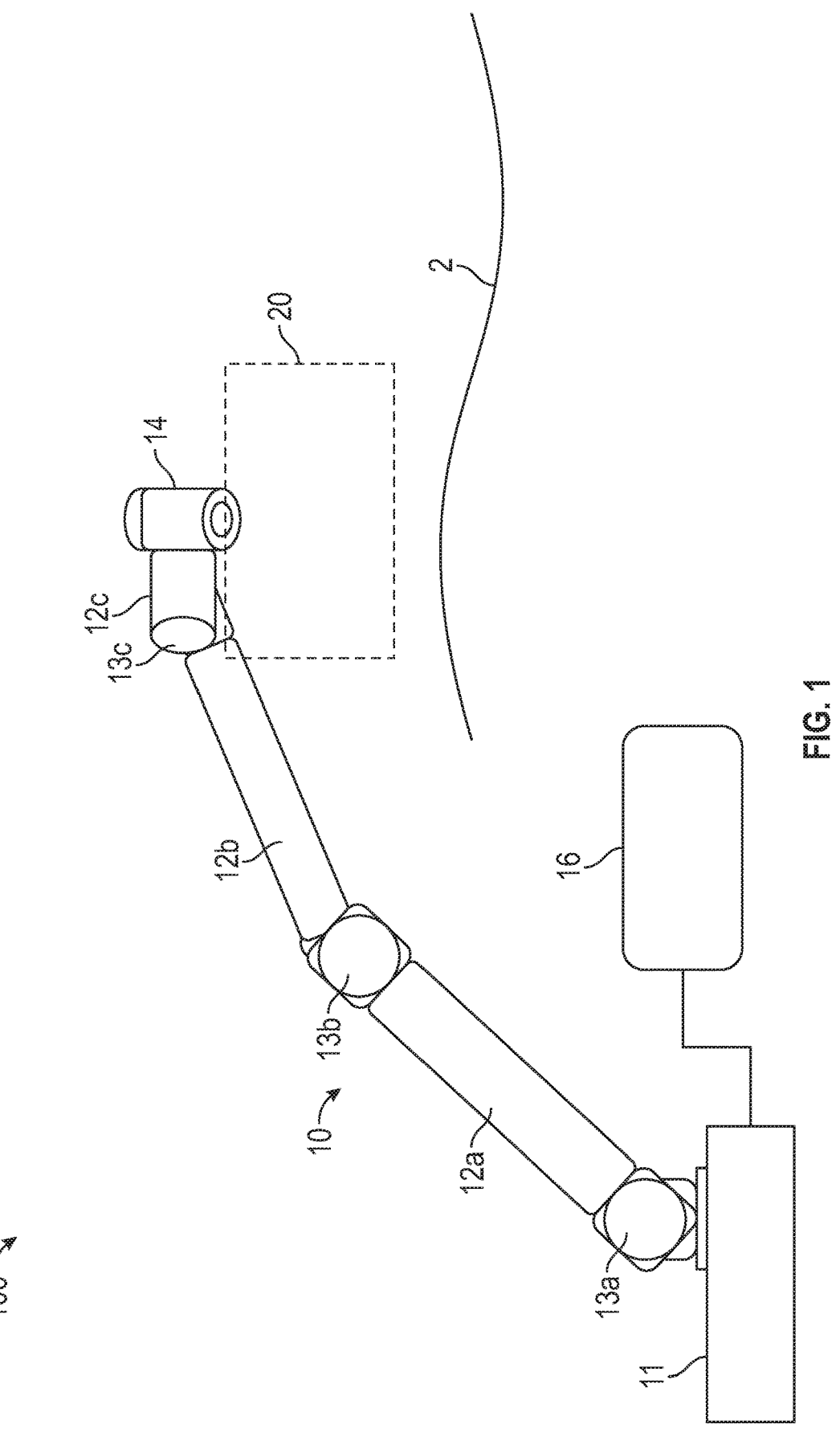
FIG. 1 illustrates a side perspective view of an automated coating system including a smart end-effector tool, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

The present disclosure provides automated systems and methods of using an end-effector tool including an applicator to apply a coating onto an object surface. An automated coating system is provided to include an end-effector tool and a motive robot arm mounted on a moving base. The tool is mounted on the motive robot arm. The tool includes an applicator to apply a coating onto an object surface. One or more first sensors are functionally connected to the applicator to detect a working state of the applicator, while the applicator applies the coating onto the object surface. One or more second sensors are provided to detect a travelling state of the tool, while the tool travelling along the object surface. A tool control circuit is provided to receive signals from the first and second sensors and process the signals to generate state information of the end-effector tool. In some embodiments, one or more of the first and second sensors may serve as safety sensors to detect safety issues, including, for example, a temperature sensor to detect high-temperature safety issue, a pressure sensor to detect any undesired contact between the tool and the object surface or intrusion of other objects, etc.

FIG. 1 illustrates a side perspective view of an automated coating system 100 having a smart end-effector tool 20 mounted thereon to travel along an object surface 2 and applying coating thereon, according to one embodiment. The coating system 100 further includes a robot arm 10. The robot arm 10 includes multiple arm sections 12a-c connected by joints 13a-c. The robot arm 10 is mounted on a moving base 11 which can move the robot arm along a predetermined path. The moving base 11 may include, for example, wheels, tracks, etc. In the depicted embodiment, the object surface 2 is an elongated wind blade. The robot arm 10 can be moved by the moving base 11 to travel along the elongated wind blade.

The smart end-effector tool 20 is functionally connected to a mounting interface 14 at the distal end of the robot arm 10. The mounting interface 14 may be designed based on certain mounting standards and compatible with various end-effector tools based on the same mounting standards. In some embodiments, the mounting interface 14 may include various mechanical and electrical means to functionally connect the tool 20 to the robot arm 10. For example, the mounting interface may include any suitable fastening device to mechanically mount the smart end-effector tool 20 onto the robot arm 10; the mounting interface may include any suitable electrical connections to communicate electrical signals between the tool and the robot arm or provide electrical power from the robot arm to the tool.

A robot controller 16 is used to execute a robot command program to control the movement of the moving base 11 and the locomotion of the robot arm 10 such that the movement trajectory of the smart end-effector tool 20 can be precisely controlled. In some embodiments, the robot arm command program may control the locomotion of the robot arm via a set of locomotion parameters including, for example, positions, orientations, velocities of the arm sections and joints, the speed of the moving base 11, etc. The object surface 2 can be, for example, a wind blade having a length about 10 meters to about 100 meters. The robot controller 16 can control the locomotion of the robot arm such that the end-effector tool 20 can contact and move around the object surface to prepare (e.g., scuffing, abrading, sanding, polishing, etc.) the object surface 2. In some embodiments, the robot controller 16 may include an optional power interface to a power source thereof to provide power to the moving base 11 and the end-effector tool 20 in the form of electricity, pneumatic pressure, etc.

FIG. 2 illustrates a side perspective view of the smart end-effector tool 20 of FIG. 1, according to one embodiment. The smart end-effector tool 20 includes a mount interface 22 to mount the end-effector tool 20 onto the mounting interface 14 of the robot arm 10. The tool 20 is controlled by the locomotion of the robot arm 10 to adjust its position, orientation, movement trajectory, etc. when travelling around the object surface 2. In the depicted embodiment of FIG. 2, the smart end-effector tool 20 includes an applicator 30 configured to apply a coating onto the object surface 2 when the tool 20 travels along a direction 5.

The applicator 30 includes one or more applicator heads 31 fluidly connected to one or more cartridges 32 to apply one or more coating materials 4 onto the object surface 2 in the form of, for example, liquid, film, powder, etc. In the depicted embodiment of FIG. 2B, the applicator 30 applies parallel lines 42 of polyurethane to a wind blade surface. The applicator 30 further includes a first air knife 33a downstream of the applicator head 31 and a second air knife 34a downstream of the first air knife 33a. The first air knife 33a is fluidly connected to a first air tank 33b to generate a high flow rate linear column of non-heated air to displace and spread out the coated polyurethane lines 42. This process may create ripples in the coating. The second air knife 34a is fluidly connected to a second air tank 34b to generate a heated column of air to smooth out the ripples and cure the polyurethane coating on the wind blade surface 2. It is to be understood that the applicator 30 may have any suitable configurations to apply a protective material onto the object surface via, for example, extrusion, spray, die slot coating, powder coating, electrostatic or chemical adhesion, etc.

Various applicator sensing elements or sensors can be provided to detect or monitor the applicator's operation or working state. For example, in some embodiments, the first and second air knives each may have one or more sensing elements such as, for example, at least one of a temperature sensor, a pressure sensor, a humidity sensor, to detect the respective operation states. In some embodiments, the applicator head 31 may include a fluid flow sensor at each opening to measure the flow rate or fluid pressure at the openings. In some embodiments, the air knives 33a-b each may include one or more of temperature sensors, pressure sensors, moisture sensors, etc., to measure the air flow rate, temperature, or pressure at each air knives.

In some embodiments, sensors such as, for example, an optical sensor 25 can be provided to detect coating application quality and monitor coating irregularities, defects, etc. The optical sensor 25 is positioned at a downstream position of the tool 30 to monitor the coating property by, for example, measure surface reflective properties of the coating to detect coating irregularities, defects, etc.

The end-effector tool 20 further includes one or more second sensors to detect travelling state information of the tool 20, while the tool 20 travels around the object surface 2 to apply coatings thereon. Related travelling state information may include, for example, displacement information between the applicator head 31 and the object surface 2, mapping information of the object surface 2 including surface positions, planes, orientations, etc. In the depicted embodiment of FIG. 2A, the second sensors of the end-effector tool 20 includes a haptic sensor 24 to detect the related working state information. It is to be understood that other suitable sensors such as, for example, an ultrasonic sensor, be used to tool travelling state information. Also, multiple sensors can be distributed at various locations of the end-effector tool to monitor its working state.

The haptic sensor 24 is positioned at an upstream position of the tool 30 and is attached to the tool 30 via an "L" shaped arm mount 24*m*. The haptic sensor 24 is provided to measure the exact displacement between the tool 20 and the objection surface 2 and continuously map the object surface 2, e.g., to obtain a 2D perspective representation or a contour of the object surface 2. The haptic sensor 24 includes one or more flexible sensing elements 24*a* extending toward the object surface 2 and having the respective distal ends 24*e* to contact the object surface 2 to provide contact measurements of the exact displacement and continuous surface mapping. In some embodiments, the flexible sensing elements 24*a* can be analog resistive and their resistance may change with the flexion amount thereof. The analog signals from the flexible sensing elements 24*a* can be amplified and sampled by a control circuit 28 of the tool 20 in real time to generate surface mapping data for the object surface 2.

Figure 2A:
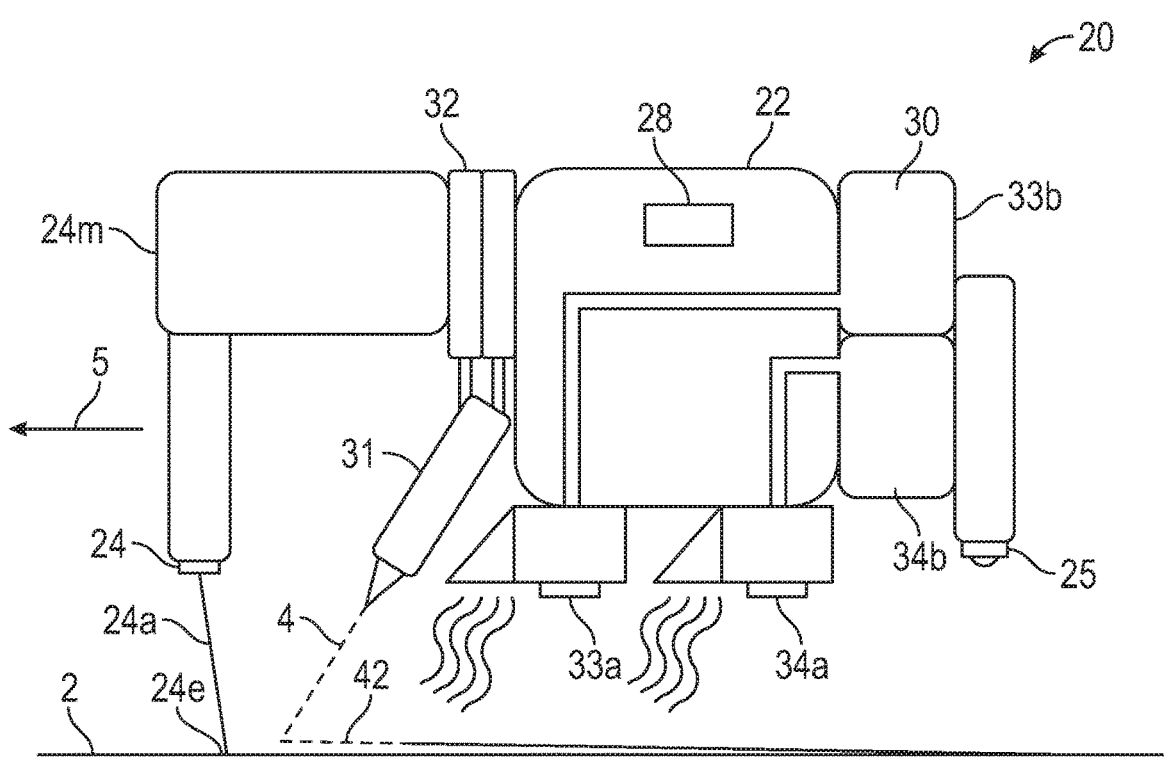
FIG. 2A illustrates a side perspective view of the smart end-effector tool of FIG. 1, according to one embodiment.
Figure 3:
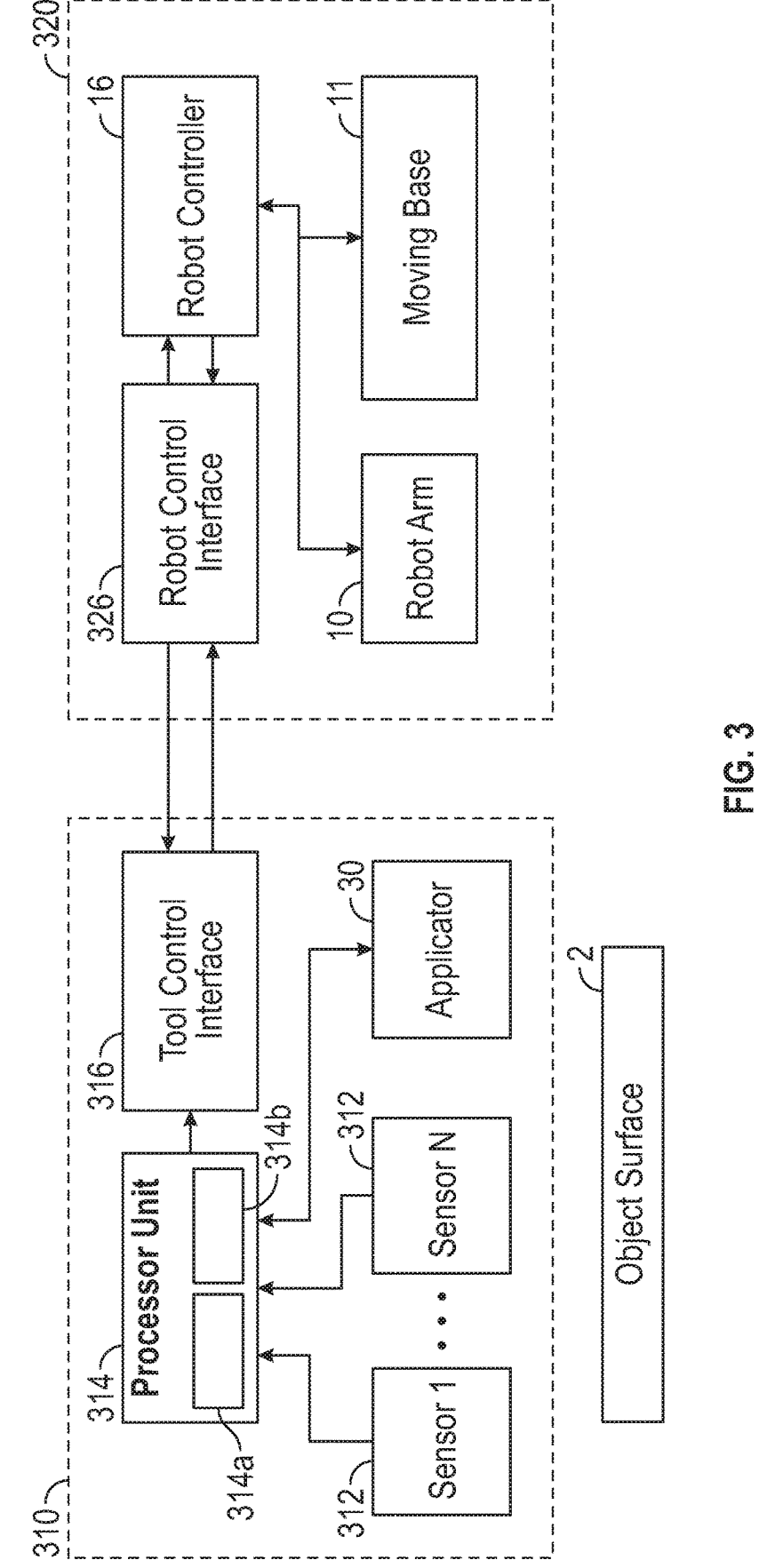
FIG. 3 illustrates a block diagram of an automated coating system including a smart end-effector tool to apply a coating an object surface, according to one embodiment.

FIG. 3 illustrates a block diagram of an automated coating system 300 including a smart end-effector tool 310 functionally connected to a motive robot 320 to apply a coating onto an object surface, according to one embodiment. Multiple sensors 312 (e.g., Sensor 1, . . . Sensor N) are provided to detect tool state information including, for example, applicator state information, tool travelling state information, safety information, etc. The sensors 312 may include, for example, applicator sensors or sensing elements provided to the applicator 30 to detect or monitor the working state of the applicator 30, and on-board tool sensors provided to detect or monitor the travelling state of the tool with respect to the object surface 2. The sensors 312 may also be used to detect possible safety or emergency issues. The applicator sensors may include, for example, one or more of a temperature sensor, a pressure sensor, a humidity sensor, a fluid flow sensor, an optical sensor, etc., provided to the respective components of the applicator. The applicator sensors may also include quality assurance (QA) sensors such as, for example, the optical sensor 25 of FIG. 2A, to detect coating application quality and monitor coating irregularities, defects, etc. The on-board tool sensors can include, for example, one or more of the flex or haptic sensor 24 of FIG. 2A, one or more ultrasonic sensors, one or more of other types of sensors to detect travelling state information of the tool 310, and any combinations of the sensors.

Figure 2B:
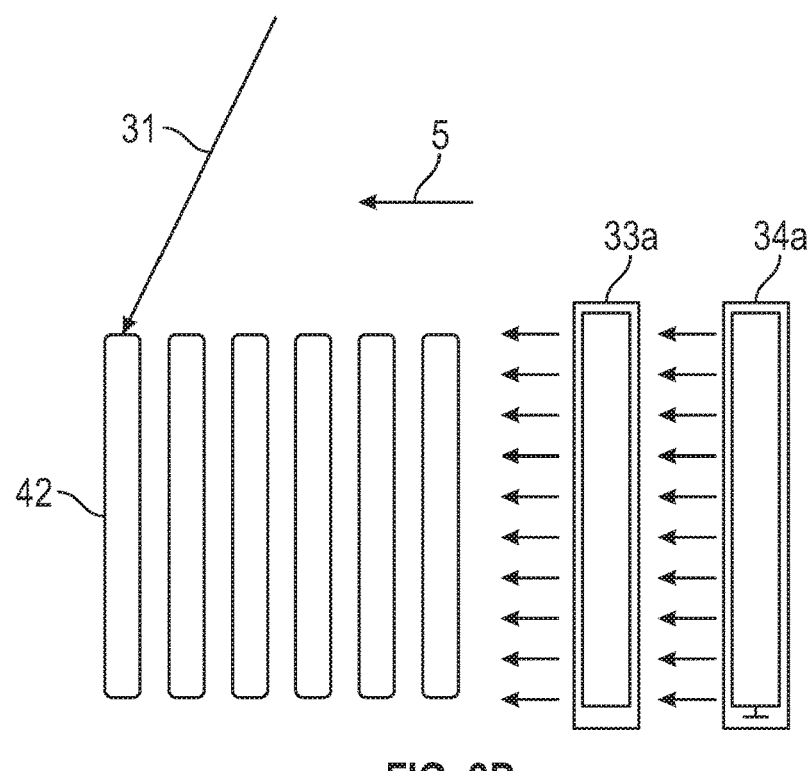
FIG. 2B illustrates a top plan view of the smart end-effector tool of FIG. 2A applying coating lines onto a wind blade, according to one embodiment.

Raw signals (e.g. analog sensor signals) from the sensors 312 are received and processed by a processor unit 314 (e.g., the control circuit 28 of FIG. 2A). The processor unit 314 may include an analog-to-digital converter (ADC) component to sample analog sensor signals and convert the analog sensor signals to digital signals. The processor unit 314 may further include a digital signal processing component to process and distill the digital signals to generate real-time tool state information, notifications, or instructions, and communicate the generated information to the robot controller 16.

In the depicted embodiment of FIG. 3, the processor unit 314 includes an applicator control unit 314*a* and a traveler control unit 314*b*. The applicator control unit 314 can receive raw signals from the applicator sensors and process the raw signals to generate applicator work state information. The traveler control unit 314*b* can receive raw signals from the on-board tool sensors and process the raw signals to generate tool travelling state information. The processor unit 314 can further process the applicator work state information and the tool travelling state information to generate real-time tool state information, notifications, and instructions.

In some embodiments, the real-time tool state information generated by the processor unit 314 of the tool may include, for example, current position or movement information of the tool with respect to the object surface. For example, in some embodiments, the processor unit 314 can combine the positioning data from an ultrasonic sensor and the surface mapping data from the haptic or flex sensor 24 to reconstruct the object surface 2 and derive a path for the end-effector tool to travel over the object surface 2 and apply a coating thereon.

The real-time tool state information may further include, for example, applicator working state information indicating whether the applicator is working properly, for example, whether the detected temperature or pressure at the air knives are within a pre-determined range, whether the detected flow rate of coating material from the applicator head is normal, whether the coating quality detected by an optical sensor is good, etc.

In some embodiments, the real-time notifications generated by the processor unit 314 of the tool may include, for example, position notifications (e.g., a notification to the robot controller that the tool is at an edge of the object surface), safety notifications (e.g., a notification to the robot controller that a temperature or pressure measurement from the applicator is above an upper limit, a notification of an impediment or obstruction), etc.

In some embodiments, the instructions generated by the processor unit 314 of the tool may include, for example, an applicator-operation instruction regarding how to control the operation of the applicator, a locomotion instruction to instruct the robot controller to adjust the position or movement of the tool, or the movement trajectory or velocity of the tool, etc. An applicator-operation instruction may include, for example, an on/off instruction to the robot controller 16 to turn on/off the applicator, a valve control instruction to the robot controller 16 to control valves of the applicator, etc. For example, the processor unit 314 may send an instruction to the robot controller 16 to instruct the robot arm to reduce the speed of the tool movement when the processor unit 314 determines that the tool is approaching the object surface. The processor unit 314 may send an emergency stop instruction to the robot controller to stop the operation of the applicator when the processor unit 314 determines that there is an emergency event (e.g., the detected pressure or temperature from the applicator is beyond a predetermined range).

The real-time state information, notifications, or instructions from the smart end-effector tool 310 can be sent to the robot controller 16 via the tool control interface 316 and the robot control interface 326. The robot controller 16 can then use the real-time state information to simultaneously update the locomotion parameters of the robot arm such that the movement trajectory of the smart end-effector tool 310 can be precisely controlled. The robot controller 16 can also control the coating system 300 accordingly by taking actions upon the notification or instructions from the smart end-effector tool 310.

In some embodiments, the robot controller 16 may receive real-time state information, notifications, or instructions from the smart end-effector tool, interpret the received information, check whether the notifications or instructions are compatible with pre-set rules, and implement instructions accordingly. For example, the robot controller 16 may provide the robot arm 10 and the moving base 11 with a movement vector for the tool's position adjustment with respect to the object surface; the robot controller 16 may instruct the applicator to start coating or adjust coating parameters upon the feedback from the process unit of the tool; the robot controller 16 can provide an emergency stop command to the applicator to stop when an emergency condition is determined by the robot controller 16, etc.

Figure 4:
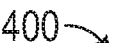
FIG. 4 illustrates a flow diagram of a method of using a coating system to prepare an object surface, according to one embodiment.
Figure 4:
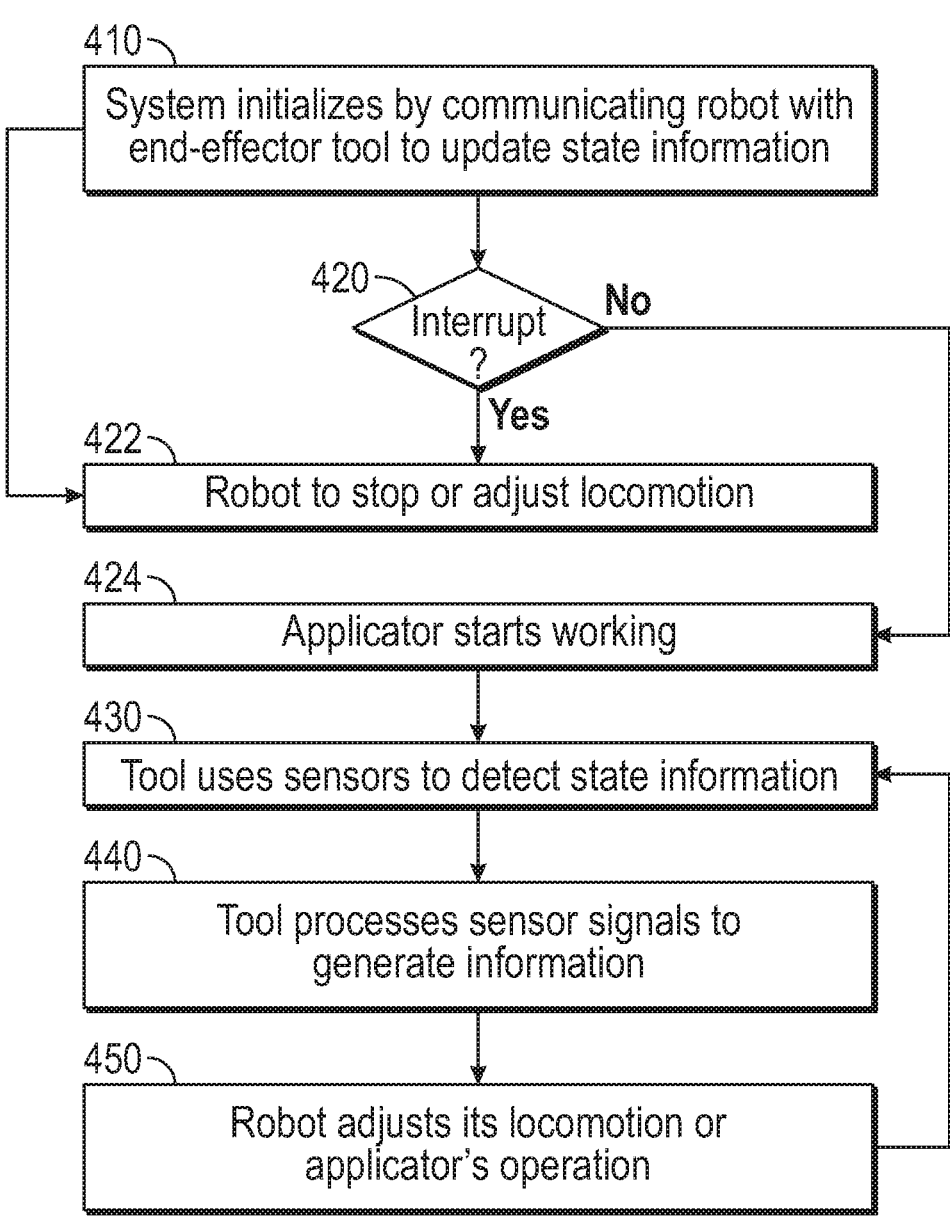

FIG. 4 illustrates a flow diagram of a method 400 of using an automated coating system described herein (e.g., the coating systems in FIGS. 1 and 3) to apply a coating onto an object surface (e.g., a wind blade), according to one embodiment.

At 410, the coating system stars by initializing communication between a robot (e.g., the robot arm 10 and the moving base 11 of FIG. 1) and an end-effector tool (e.g., the tool 20 of FIG. 1). The robot and the end-effector tool of the coating system communicate with each other to update the respective state information. Such respective state information may include, for example, power on self-tests (POST), starting orientations and coordinate systems, coating parameters (e.g. fluid flow rate, air pressure, air temperature, etc.), etc. The end-effector tool may receive state information of the robot from a robot control interface of the robot arm. The state information of the robot arm may include a set of locomotion parameters including, for example, positions, orientations, velocities of the arm sections and joints, and the movement information of the moving base.

The end-effector tool can detect its own working state via the various sensors (e.g., the sensors 312 of FIG. 3) and determine at 420 whether to interrupt the initialization of the robot arm the moving base by sending notifications or instructions to the robot controller to stop or adjust the locomotion of the robot arm at 422 before re-initializing the system at 410. For example, in some embodiments, when the tool detects an emergency event, the tool can send notification to stop the initialization. In some embodiments, when the tool detects an object surface to be coated, the tool can send instructions to the robot controller to adjust locomotion of the robot arm to position the tool at an initial position to coat the object surface. When the end-effector tool determines not to interrupt the initialization of the system, the method then proceeds to 424 to instruct the applicator to start working.

At 430, the end-effector tool uses its sensors to detect its working state information, while the tool is moved by the robot arm and the applicator starts to coat the object surface. Raw signals can be generated by one or more sensors 312 (e.g., Sensor 1, . . . Sensor N of FIG. 3) to detect tool state information including, for example, applicator state information, tool travelling state information, safety information, etc. The method 400 then proceeds to 440.

At 440, the end-effector tool processes, via a processor unit (e.g., the processor unit 314 of FIG. 3), the sensor signals to generate tool state information, notifications, or instructions and send the generated state information, notifications, or instructions to a robot controller. The robot controller receives the feedback from the end-effector tool and can take actions accordingly, e.g., to continuously update the locomotion parameters of the robot arm to adjust its locomotion and the tool's operation at 450.

At 450, the robot controller can adjust the locomotion parameters of the robot arm and the moving base and the operation of the applicator based on the received state information, notifications, or instructions from the tool and start a motion sequence defined by the adjusted locomotion parameters to precisely position the tool along a pre-determined movement trajectory and operate the applicator accordingly.

The method 400 can work in an iterative manner. An exemplary iterative process may star by moving the tool in a direction and continually detecting updates of working state from the tool. The tool, while measuring its working state including its travelling information and the operation state information of the applicator, can derive any state updates from the measurements, send the updates to the robot controller to adjust its locomotion and/or the applicator's operation. This process continually repeats until the operation is complete. In this iterative manner, a coating system described herein can automatically and dynamically control and operate a coating process to apply a coating onto an object surface.

The present disclosure provides automated systems and methods of using a smart end-effector tool to apply a coating onto an object surface. The smart end-effector tool allows for a localized data collecting and processing to detect working state information of the end-effector tool and update such a state awareness with a remote robot controller in real time. In some embodiments, such a state awareness can be updated with the remote robot controller many times a second which allows an instantaneous control of the locomotion of a robot arm based on the feedback from the end-effector tool. The smart end-effector tool can process and distill sensor raw signals to generate tool working state information, notifications, or instructions to the remote robot controller, which significantly reduces the amount of data being sent across to a centralized system. The systems and methods described herein can determine real-time tool state information within the context of control in complex situations that may not allow for a rapid response from the centralized system.

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

LISTING OF EXEMPLARY EMBODIMENTS

Exemplary embodiments are listed below. It is to be understood that any one of embodiments 1-13 and 14-22 can be combined.

Embodiment 1 is an end-effector tool mounted on a motive robot arm to apply a coating onto an object surface, the tool comprising:

an applicator configured to apply a coating onto an object surface;

one or more first sensors configured to detect a working state of the applicator, while the applicator applies the coating onto the object surface;

one or more second sensors configured to detect a trav-
elling state of the tool, while the tool travelling under
the locomotion of the motive robot arm along the object
surface; and
a tool control circuit to receive signals from the first and
second sensors and process the signals to generate state
information of the end-effector tool.
Embodiment 2 is the tool of embodiment 1, wherein the
applicator includes one or more applicator heads fluidly
connected to one or more cartridges to apply one or more
coating materials onto the object surface.
Embodiment 3 is the tool of embodiment 1 or 2, wherein the
applicator further includes one or more air knives down-
stream of the applicator heads to displace, feather and cure
the coating materials on the object surface.
Embodiment 4 is the tool of embodiment 3, wherein the
applicator further includes one or more pressurized air tanks
fluidly connected to the air knives to provide pressurized air.
Embodiment 5 is the tool of any one of embodiments 1-4,
further comprising a mounting interface to functionally
connect the tool to the motive robot arm.
Embodiment 6 is the tool of any one of embodiments 1-5,
wherein the one or more first sensors include at least one of
a temperature sensor, a pressure sensor, a humidity sensor,
a fluid flow sensor, and an optical sensor.
Embodiment 7 is the tool of embodiments 6, wherein the
optical sensor is to detect an optical property of the coating
on the object surface.
Embodiment 8 is the tool of embodiment 6 or 7, wherein at
least one of the optical sensors is located downstream of the
applicator.
Embodiment 9 is the tool of any one of embodiments 1-8,
wherein the one or more second sensors include one or more
haptic sensors to map the object surface.
Embodiment 10 is the tool of embodiment 9, wherein at least
one of the haptic sensors is located upstream of the appli-
cator.
Embodiment 11 is an automated coating system comprising:
the end-effector tool of any one of embodiments 1-10;
a motive robot arm mounted on a moving base,
wherein the tool is mounted on the motive robot arm.
Embodiment 12 is the system of embodiment 11, wherein
the motive robot arm further includes a microprocessor to
execute a robot controller.
Embodiment 13 is the system of embodiment 11 or 12,
wherein the control circuit of the tool communicates with
the robot controller to send instructions to the robot con-
troller adjust the locomotion of the motive robot arm and the
applicator's operation.
Embodiment 14 is a method of coating an object surface, the
method comprising:
providing an end-effector tool to a motive robot arm, the
tool comprising an applicator configured to apply a
coating onto the object surface;
communicating the tool with the robot arm to update the
respective state information;
while the applicator applies the coating onto the object
surface, detecting, via one or more first sensors of the
tool, a working state of the applicator to generate
applicator state signals, and detecting, via one or more
second sensors of the tool, a travelling state of the tool
to generate tool travelling state signals;
processing, via a control circuit of the tool, the applicator
state signals and the tool travelling state signals from
the respective first and second sensors to generate
real-time tool state information, notifications or instruc-
tions;

transmitting the real-time tool state information, the noti-
fications, or the instructions from the control circuit to
a robot controller of the robot arm; and
adjusting the tool's movement with respect to the object
surface and the applicator's operation based on the
real-time tool state information, the notifications, and
the instructions from the end-effector tool.
Embodiment 15 is the method of embodiment 14, wherein
generating the applicator state signals comprises generating
sensor raw signals via one or more of a temperature sensor,
a pressure sensor, a humidity sensor, and a fluid flow sensor.
Embodiment 16 is the method of embodiment 14 or 15,
wherein detecting the working state of the applicator com-
prises using an optical sensor to detect an optical property of
the coating on the object surface.
Embodiment 17 is the method of any one of embodiments
14-16, wherein detecting the travelling state of the tool
comprises using a haptic sensor to obtain surface mapping
data.
Embodiment 18 is the method of any one of embodiments
14-17, wherein the real-time tool state information includes
at least one of tool movement information, an object surface
contour, and applicator working state information.
Embodiment 19 is the method of any one of embodiments
14-18, wherein the notifications include at least one of an
emergency event notification, or a status update notification.
Embodiment 20 is the method of any one of embodiments
14-19, wherein the instructions include at least one of an
instruction to adjust a position, a velocity, or a trajectory of
the tool, or an instruction to adjust the applicator's opera-
tion.
Embodiment 21 is the method of any one of embodiments
14-20, further comprising adjusting, via a tool controller, the
movement of a moving base based on the real-time tool state
information, the notifications, and the instructions from the
end-effector tool, wherein the motive robot arm is movable
by the moving base.
Embodiment 22 is the method of any one of embodiments
14-21, wherein the object surface includes a wind blade.
    Reference throughout this specification to "one embodi-
ment," "certain embodiments," "one or more embodiments,"
or "an embodiment," whether or not including the term
"exemplary" preceding the term "embodiment," means that
a particular feature, structure, material, or characteristic
described in connection with the embodiment is included in
at least one embodiment of the certain exemplary embodi-
ments of the present disclosure. Thus, the appearances of the
phrases such as "in one or more embodiments," "in certain
embodiments," "in one embodiment," or "in an embodi-
ment" in various places throughout this specification are not
necessarily referring to the same embodiment of the certain
exemplary embodiments of the present disclosure. Further-
more, the particular features, structures, materials, or char-
acteristics may be combined in any suitable manner in one
or more embodiments.
    While the specification has described in detail certain
exemplary embodiments, it will be appreciated that those
skilled in the art, upon attaining an understanding of the
foregoing, may readily conceive of alterations to, variations
of, and equivalents to these embodiments. Accordingly, it
should be understood that this disclosure is not to be unduly
limited to the illustrative embodiments set forth herein-
above. In particular, as used herein, the recitation of numeri-
cal ranges by endpoints is intended to include all numbers
subsumed within that range (e.g., 1 to 5 includes 1, 1.5, 2,
2.75, 3, 3.80, 4, and 5). In addition, all numbers used herein
are assumed to be modified by the term "about." Further-more, various exemplary embodiments have been described. These and other embodiments are within the scope of the following claims.

What is claimed is:

1. An end-effector tool mounted on a motive robot arm to apply a coating onto an object surface, the tool comprising:

an applicator configured to apply a coating onto an object surface;

one or more first sensors configured to detect a working state of the applicator, while the applicator applies the coating onto the object surface;

one or more second sensors configured to detect a travelling state of the tool, while the tool is travelling under a locomotion of the motive robot arm along the object surface; and a tool control circuit configured to:

receive analog signals from the one or more first sensors and the one or more second sensors;

execute an analog-to-digital converter (ADC) to convert the analog signals to digital signals;

implement digital signal processing (DSP) to process the digital signals to generate travelling state information with respect to the end-effector tool, wherein the traveling state information comprises at least one of displacement information between the applicator and the object surface or mapping information of the object surface;

update one or more locomotion parameters associated with the locomotion of the motive arm along the object surface, the one or more locomotion parameters including one or more of position information, orientation information, velocity information of arm sections and/or joints of the end-effector tool, or a speed of a moving base of the end- effector tool; and adjust the locomotion of the motive arm along the object surface as defined by the updated one or more locomotion parameters such that a trajectory of the applicator along the object surface reflects the updated one or more locomotion parameters.

2. The end-effector tool of claim 1, wherein the applicator includes one or more applicator heads fluidly connected to one or more cartridges to apply one or more coating materials onto the object surface.

3. The end-effector tool of claim 2, wherein the applicator further includes one or more air knives downstream of the applicator heads to displace, feather and cure the one or more coating materials applied onto the object surface.

4. The end-effector tool of claim 3, wherein the applicator further includes one or more pressurized air tanks fluidly connected to the one or more air knives to provide pressurized air.

5. The end-effector tool of claim 1, further comprising a mounting interface to functionally connect the tool to the motive robot arm.

6. The end-effector tool of claim 1, wherein the one or more first sensors include at least one of a temperature sensor, a pressure sensor, a humidity sensor, a fluid flow sensor, and an optical sensor.

7. The end-effector tool of claim 6, wherein the optical sensor is to detect an optical property of the coating on the object surface.

8. The end-effector tool of claim 6, wherein the optical sensor is located downstream of the applicator.

9. The end-effector tool of claim 1, wherein the one or more second sensors include one or more haptic sensors to map the object surface.

10. The end-effector tool of claim 9, wherein at least one of the one or more haptic sensors is located upstream of the applicator.

11. An automated coating system comprising:

the end-effector tool of claim 1, wherein the motive robot arm is mounted on the moving base, and wherein the tool is mounted on the motive robot arm, wherein the motive robot arm further includes a microprocessor to execute a robot controller, and wherein the control circuit of the tool communicates with the robot controller to send instructions to the robot controller to adjust the locomotion of the motive robot arm and the applicator's operation.

12. The end-effector tool of claim 1, wherein the motive arm is mounted on the moving base.

13. The end-effector tool of claim 11, wherein to adjust the adjust the locomotion of the motive arm, the tool control circuit is configured to stop operation of the motive arm.

14. The end-effector tool of claim 13, wherein the instructions sent to the robot controller include an emergency stop instruction.

15. The end-effector tool of claim 14, wherein the tool control circuit is configured to detect an emergency event based on at least one of the analog signals or the digital signals.

* * * * *